United States Patent [19]

Rossberg

[11] Patent Number: 5,217,517
[45] Date of Patent: Jun. 8, 1993

[54] METHOD OF MANUFACTURING A FUSED FIBER COUPLER

[75] Inventor: Rolf Rossberg, Schwieberdingen, Fed. Rep. of Germany

[73] Assignee: Alcatel N.V., Amsterdam, Netherlands

[21] Appl. No.: 858,546

[22] Filed: Mar. 27, 1992

[30] Foreign Application Priority Data

Mar. 27, 1991 [DE] Fed. Rep. of Germany ....... 4109982

[51] Int. Cl.$^5$ .......................................... C03B 37/027
[52] U.S. Cl. ........................................ 65/4.21; 65/29; 385/28
[58] Field of Search ............. 65/2, 3.11, 3.12, 29, 65/4.2, 4.21; 385/28

[56] References Cited

U.S. PATENT DOCUMENTS

| | | |
|---|---|---|
| 4,796,968 | 1/1989 | Coccoli et al. |
| 4,957,338 | 9/1990 | Thorncraft et al. ............. 65/4.21 X |
| 5,064,267 | 11/1991 | Rossberg ............................... 385/50 |

FOREIGN PATENT DOCUMENTS

| | | |
|---|---|---|
| 0404587 | 12/1990 | European Pat. Off. |
| 416640 | 3/1991 | Fed. Rep. of Germany. |
| 3050507 | 5/1991 | Japan. |
| 89/12243 | 12/1989 | PCT Int'l Appl. |

OTHER PUBLICATIONS

"Deutsch Norm" (German Standard), Aug. 1987, DIN VDE 0888, Part 2, Sec. 6.2.

Minelly et al.: "Wavelength Combining Fused-Taper Couplers with Low Sensitivity to Polarisation for use with 1480nm-Pumped Erbium-Doped Fibre Amplifiers", Apr. 1990, pp. 523-524, Electronics Letters, vol. 26, No. 8, Great Britain.

Wilkinson et al.: "Closed-Spaced Fused Fibre Wavelength Division Multiplexers with very Low Polarisation Sensitivity", Mar. 1990, pp. 382-384, Electronics Letters, vol. 26, No. 6, Great Britain.

Primary Examiner—Robert L. Lindsay
Attorney, Agent, or Firm—Frishauf, Holtz, Goodman & Woodward

[57] ABSTRACT

To make a fused fiber coupler (1) which is especially suited as a pump coupler for use in fiber amplifiers, exhibits low sensitivity to polarization, and can be spliced in with low loss, commercially available single-mode fibers are employed. After completion of an elongating process and interruption of heat from a heat supply, the input-fiber pair (fiber ends 4, 5) and the output-fiber (fiber ends 6, 7) of two fused lengths of the fiber (2, 3) are twisted by 180° about their common axis and fixed in this position.

2 Claims, 1 Drawing Sheet

METHOD OF MANUFACTURING A FUSED FIBER COUPLER

BACKGROUND OF THE INVENTION

1. Field of the Invention

The present invention relates to a method of manufacturing a fused fiber coupler, particularly a pump coupler for fiber-optic amplifiers, wherein at least two single-mode fibers made according to DIN VDE 0888, Part 2, August 1987, Sec. 6.2, lie side by side in the same plane and form an input-fiber pair and an output-fiber pair that are fused together, and elongated under heat. Such couplers are used particularly in optical communication systems.

2. Description of the Prior Art

In "ELECTRONICS LETTERS", 12th April 1990, Vol. 26, No. 8, pages 523 and 524, a fused fiber coupler is described in an article by J. D. Minelly and M. Suyama entitled "WAVELENGTH COMBINING FUSED-TAPER COUPLERS WITH LOW SENSITIVITY TO POLARISATION FOR USE WITH 1480 nm-PUMPED ERBIUM-DOPED FIBRE AMPLIFIERS". It is made from a special fiber with a cut-off wavelength of 1450 nm and a numerical aperture of 0.2. This fused fiber coupler exhibits low sensitivity to polarization as is desired in fiber amplifiers, for example, but its fibers introduce increased attenuation at the splice to commercially available single-mode fibers as are employed for fiber-optic transmission links, because their mode-field diameters differ from those of the single-mode fibers. In addition, the special fiber is not available commercially, difficult to procure and, therefore, expensive, In another article published in "ELECTRONICS LETTERS" 15th March 1990, Vol. 26, No. 6, pages 382 to 384, I. J. Wilkinson and C. J. Rowe report on fused fiber couplers in which polarization sensitivity was reduced by twisting the fiber pairs after tapering. Nothing is said about the type of fiber used, nor whether couplers with this property can also be fabricated for the wavelengths 1480/1550 nm.

Specialized dealers are offering wavelength-selective fused fiber couplers for different wavelengths and different channel spacings which are fabricated from commercially available single-mode fibers with a core diameter of 9 $\mu$m or 10 $\mu$m and a cladding diameter of 125 $\mu$m, which conform to DIN VDE 0888, Part 2, August 1987, Sec. 6.2, for example. At particular wavelengths and particular channel spacings, however, the characteristics of these couplers are dependent on the direction of polarization of the light.

1480/1550 nm fused fiber couplers made from normal commercially available single-mode fibers are especially suited as pump couplers for fiber amplifiers. However, such couplers are highly polarization-sensitive. A negative effect of this sensitivity is that it causes gain variations.

The entire contents of all of the publications identified herein are incorporated herein by reference.

SUMMARY OF THE INVENTION

It is the object of the invention to provide a method of manufacturing a fused fiber coupler from a commercially available single-mode fiber (9/125 $\mu$m to 10/125 $\mu$m) which exhibits low sensitivity to polarization and is especially suited as a pump coupler for use in fiber amplifiers. This object is attained by providing at least two single-mode fibers made according to DIN VDE 0888, Part 2, August 1987, Sec. 6.2, which are positioned to lie side by side in the same plane and form an input-fiber pair and an output-fiber pair and an output-fiber pair are fused together and elongated under heat, and wherein the manufacturing method comprises the steps of: interrupting the heat supply after completion of the elongating process of the fused fiber coupled; twisting the input-fiber pair and the output-fiber pair by approximately 180° about thus common axis; and thus fixing the then twisted pairs of the twisted position. Advantages of the invention will become apparent from the following description.

BRIEF DESCRIPTION OF THE DRAWINGS

An embodiment of the invention will now be described in more detail with reference to the accompanying drawing, in which.

DETAILED DESCRIPTION

Figure 1:
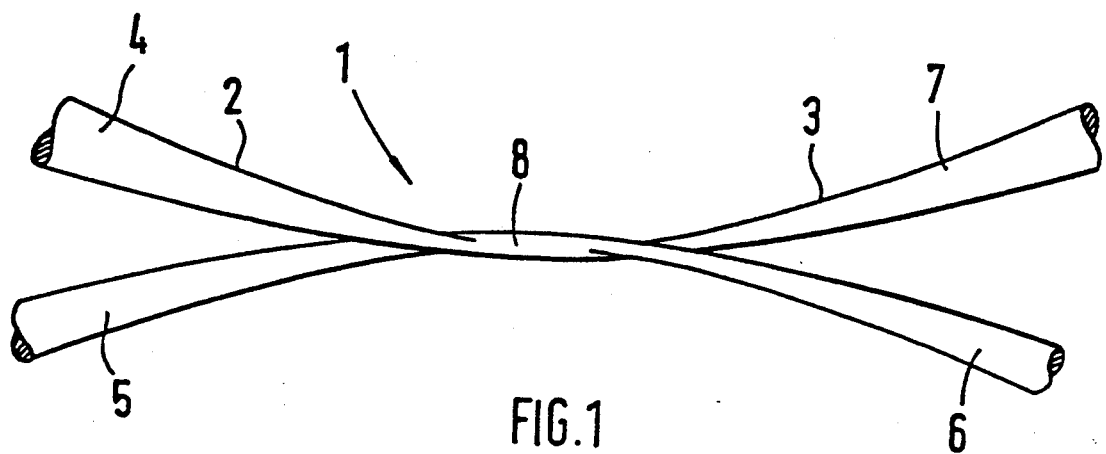
FIG. 1 shows schematically a finished fused fiber coupler.
Figure 2:
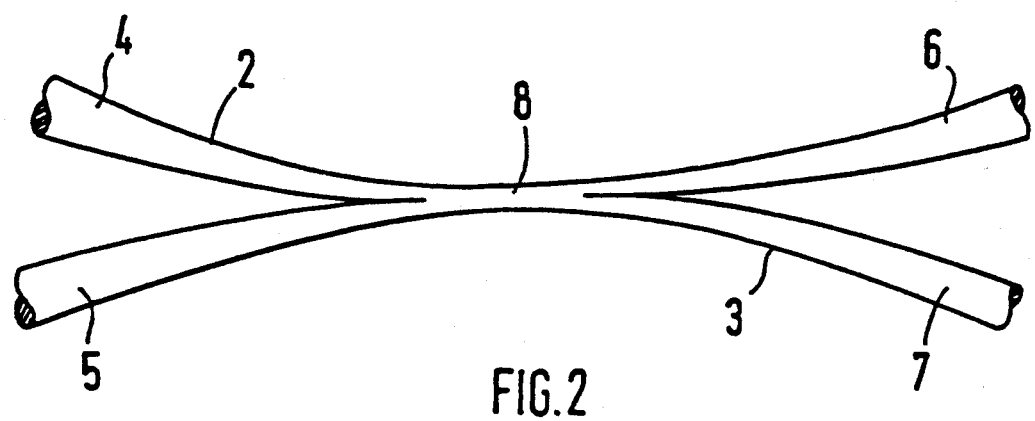
FIG. 2 shows the fused fiber coupler of FIG. 1 during manufacture.

To fabricate the fused fiber coupler 1 illustrated n FIG. 1, a commercially available single-mode fiber of the matched-cladding type with a 9 to 10 $\mu$m core diameter and a 125 $\mu$m cladding diameter as specified in DIN VDE 0888, Part 2, August 1987, Sec. 6.2, is used as base material. Two lengths 2, 3 of such a fiber are stripped, cleaned, and placed in an elongating device (not shown), so that they adjoin one another in one plane at the point forming the subsequent interaction region. The lengths, of fiber 2, 3 are then fixed in the elongating device, and light of a selected wavelength is launched into one of two adjacent fiber ends 4, 5. This light can be detected at both opposite fiber ends 6, 7. Thereafter, the lengths of fibers 2, 3 are fused together at the point of contact by applying heat and the fiber arrangement is simultaneously elongated (FIG. 2), with the light being coupled from one length of fiber to another in the fused region 8.

If the finished fused fiber coupler 1 is to have a channel spacing of, e.g., 70 nm, the light of a selected wavelength, e.g., 1480 nm, is allowed to couple 20 times from one length of fiber to the other during the elongating process. The elongating process is then stopped and the supply of heat interrupted. If a gas flame is used, the interaction length of the fused fiber coupler 1 is approximately 15 to 25 mm at this stage, depending on the width of the flame. Immediately after the end of the elongating process and after the interruption of the heat supply, the input-fiber pair of the coupler, formed by two fiber ends 4, 5 which are adjacent to each other in one plane, and the output-fiber pair, formed by the corresponding fiber ends 6, 7 on the opposite side, are twisted by approximately 180° about their common axis. The coupler 1 is then removed from the elongating device and fixed in position, e.g., by being embedded in a fused-quartz half-shell.

The fused fiber coupler 1 made by this method is wavelength-selective and nearly polarization-insensitive. Channel isolation, which is commonly 12 dB, for example, is considerably better in this coupler and exceeds 20 dB. If the coupler 1 is used as a pump coupler with even greater wavelength spacings, such as 800/1550 nm or 980/1550 nm, it will be completely polarization-insensitive. The branch of the coupler not used for the pump light can be employed for monitoring purposes and to control the pump source, since at high pump—powers and despite high crosstalk attenuation (approx. 25 dB to 30 dB), a detectable signal is still available in the unused branch.

While the invention has been described with reference to the drawings and method disclosed herein, it is not confined to the details set forth, and is intended to cover modifications or changes as may come within the scope of the following claims.

I claim:

1. A method for manufacturing a fused fiber coupler, such as a pump coupler for fiber-optic amplifiers, comprising the steps of:

placing at least two single-mode fibers, to lie side by side in a common plane to form at least one input-fiber pair and at least one output-fiber pair;

said at least tow single-mode fibers respectively being formed of a matched cladding type single-mode fiber, including a core having a diameter of about 8-10 μm and a cladding formed around said core, said cladding having a diameter of about 125 μm;

applying heat to said at least two single-mode fibers from a heat source;

fusing said at least two single-mode fibers together;

elongating said at least two single-mode fibers while said heat is applied from said heat source during said fusing step;

interrupting said heat supplied by said heat source, after said elongating step is completed; and thereafter twisting the at least one input-fiber pair and the at least one output-fiber pair by approximately 180° about a common axis; and fixing the thus twisted pairs in the twisted position.

2. A method as claimed in claim 1, wherein:

the fused fiber coupled comprises a 1480/1550 nm fused fiber coupler having a channel spacing of 70 nm; and the method further comprising the steps of:

launching a light, during manufacture of said 1480/1550 nm fused fiber coupler, into one fiber end of one of said at least two single-mode fibers;

detecting the coupling of said launched light from fiber to fiber with a detecting means, during said elongation step;

allowing the launched light to couple from fiber to fiber about 19 to 20 times during the elongating step; and then stopping the elongating of said 1480/1550 nm fused fiber coupled.

* * * * *